(12) United States Patent
Moodie

(10) Patent No.: US 12,518,298 B2
(45) Date of Patent: Jan. 6, 2026

(54) METHODS AND SYSTEMS FOR TARGETED ADVERTISEMENT BASED ON REAL-TIME METADATA EXTRACTION

(71) Applicant: Torc Robotics, Inc., Blacksburg, VA (US)

(72) Inventor: Daniel Moodie, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/405,510

(22) Filed: Jan. 5, 2024

(65) Prior Publication Data

US 2025/0225550 A1   Jul. 10, 2025

(51) Int. Cl.
*G06Q 30/02* (2023.01)
*G06Q 30/0251* (2023.01)

(52) U.S. Cl.
CPC ..... *G06Q 30/0265* (2013.01); *G06Q 30/0264* (2013.01)

(58) Field of Classification Search
CPC ................. G06Q 30/0265; G06Q 30/0264
See application file for complete search history.

(56) References Cited

U.S. PATENT DOCUMENTS

| | | | |
|---|---|---|---|
| 8,861,925 B1* | 10/2014 | Ohme | H04N 5/76 386/207 |
| 10,970,745 B2 | 4/2021 | Dawson et al. | |
| 2008/0133323 A1 | 6/2008 | Willms | |
| 2013/0238441 A1* | 9/2013 | Panelli | B60Q 1/544 705/14.62 |
| 2013/0325629 A1 | 12/2013 | Harrison | |
| 2019/0050904 A1* | 2/2019 | Wasserman | G08G 1/0116 |
| 2020/0090562 A1* | 3/2020 | DeLorean | G09F 19/22 |
| 2022/0198518 A1 | 6/2022 | Prozzi et al. | |
| 2022/0270135 A1 | 8/2022 | Terzian | |
| 2023/0162243 A1* | 5/2023 | Southin | G06Q 30/06 705/306 |

OTHER PUBLICATIONS

"Smart Billboards are Checking you out—and making judgments". (Published on Sep. 26, 2017 at the Seattle Times website at https://www.seattletimes.com/business/smart-billboards-are-checking-you-out-and-making-judgments/) (Year: 2017).*

* cited by examiner

*Primary Examiner* — James M Detweiler
(74) *Attorney, Agent, or Firm* — Armstrong Teasdale LLP

(57) ABSTRACT

An autonomous vehicle including a network of one or more sensors positioned on a body of the autonomous vehicle, one or more display devices mounted on one or more exterior sides of the autonomous vehicle, at least one processor, and at least one memory storing instructions is disclosed. The instructions, when executed by the at least one processor, configure the at least one processor to: (i) receive sensor data from the network of one or more sensors; (ii) generate, from the sensor data, metadata associated with a motor vehicle in proximity of the autonomous vehicle; (iii) determine, based at least in part on the metadata, media content for displaying to a user of the motor vehicle; and (iv) initiate display of the media content on the one or more display devices mounted on the one or more exterior sides of the autonomous vehicle.

10 Claims, 6 Drawing Sheets

METHODS AND SYSTEMS FOR TARGETED ADVERTISEMENT BASED ON REAL-TIME METADATA EXTRACTION

TECHNICAL FIELD

The field of the disclosure relates generally to an autonomous vehicle and, more specifically, methods and systems for targeted advertisement based on real-time metadata extraction.

BACKGROUND OF THE INVENTION

Autonomous vehicles employ three fundamental technologies: perception, localization, and behavior planning and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Behavior planning and control technologies determine how to move through the sensed environment to reach a planned destination. Behavior planning and control technologies process data representing the sensed environment and localization or mapping data to plan maneuvers and routes to reach the planned destination. Information collected using perception and localization technologies may be used not only for behavior planning and control technologies of the autonomous vehicle. Accordingly, there is a need of applications in which the information collected using perception and localization technologies may be used.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, an autonomous vehicle including a network of one or more sensors positioned on a body of the autonomous vehicle, one or more display devices mounted on one or more exterior sides of the autonomous vehicle, at least one processor, and at least one memory storing instructions is disclosed. The instructions, when executed by the at least one processor, configure the at least one processor to: (i) receive sensor data from the network of one or more sensors; (ii) generate, from the sensor data, metadata associated with a motor vehicle in proximity of the autonomous vehicle; (iii) determine, based at least in part on the metadata, media content for displaying to a user of the motor vehicle; and (iv) initiate display of the media content on the one or more display devices mounted on the one or more exterior sides of the autonomous vehicle.

In another aspect, a computer-implemented methos is disclosed. The computer-implemented method includes (i) receiving, at a computing device of an autonomous vehicle, sensor data from a network of one or more sensors; (ii) generating, from the sensor data, metadata associated with a motor vehicle in proximity of the autonomous vehicle; (iii) determining, based at least in part on the metadata, media content for displaying to a user of the motor vehicle; (iv) initiating display of the media content on a display device mounted on an exterior of the autonomous vehicle.

In yet another aspect, a computer-implemented methos is disclosed. The computer-implemented method includes (i) receiving, from a computing device of an autonomous vehicle, sensor data from a network of one or more sensors positioned on the autonomous vehicle; (ii) generating, from the sensor data, metadata associated with a motor vehicle in proximity of the autonomous vehicle; (iii) determining, based at least in part on the metadata, a traffic route pattern of the motor vehicle; (iv) determining, based at least in part on the traffic route pattern of the motor vehicle, media content and a schedule for displaying the media content to a user of the motor vehicle; and (v) transmitting, to the computing device of the autonomous vehicle, the media content and the schedule to cause display on a display device mounted on an exterior of the autonomous vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
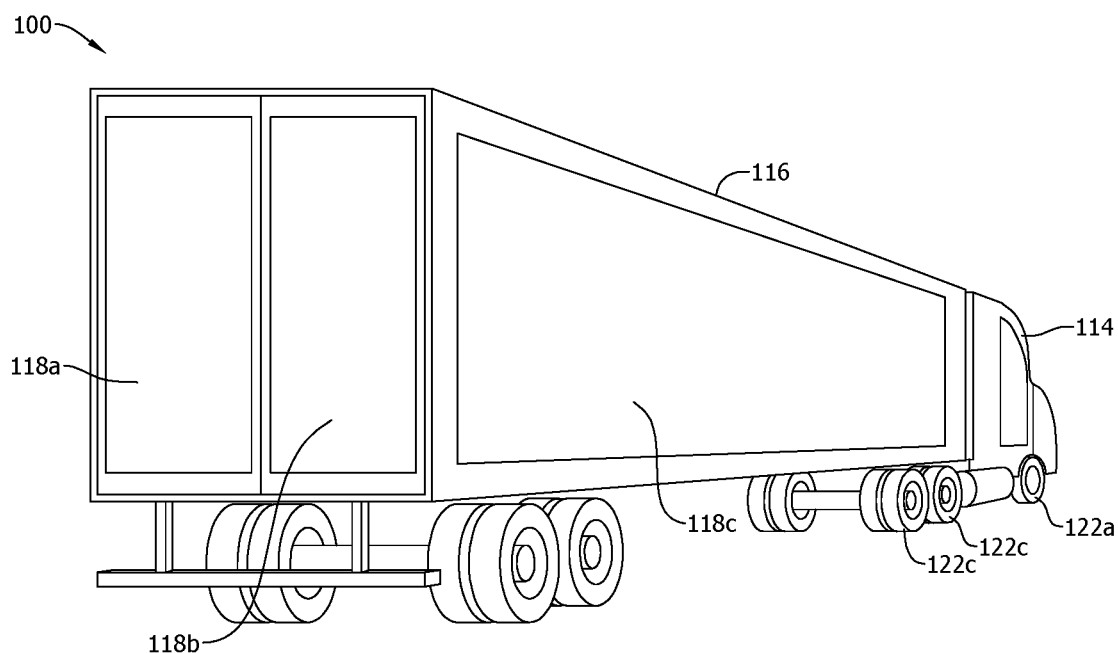
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver for operating the semi-autonomous vehicle.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, also referenced herein as a centralized or regionalized control, is a hub in communication with one or more autonomous vehicles of a fleet. Database or datastore at mission control may store metadata or other information derived using the metadata. Additionally, advertisements or media content and rules for displaying the advertisements or media content may also be stored at the database or datastore. Database or datastore may be in a cloud network.

Various embodiments described herein are directed to targeted advertising based on geolocation, traffic density, and identifying information of other motor vehicles for consumption by other road users. Identifying information of other motor vehicles may be referenced herein as metadata, which may include, but is not limited to, a vehicle make, a vehicle model, a driving pattern of a uniquely identified vehicle, and current traffic conditions. Metadata is used for identifying specific advertisement or advertisement targeted to specific road users for display by the autonomous vehicle.

An autonomous vehicle may be equipped with sensors such as, one or more microphones or other acoustic sensors, one or more cameras, one or more radio detection and ranging (RADAR) sensors, one or more light detection and ranging (LiDAR) sensors, one or more inertial measurement unit (IMU) sensors, or one or more global navigation satellite system (GNSS) sensors, etc., to identify current geolocation of the autonomous vehicle, metadata of the other moving vehicles (e.g., make and/or model of the vehicles, license plate information of the vehicles), current traffic conditions or traffic density may be identified. Using a fleet of autonomous vehicles equipped with the sensors, other motor vehicles' locations throughout the day may be identified using the metadata of the other moving vehicles. Based on the identified locations for each motor vehicle (identified using metadata such as license plate information), a route of each motor vehicle may be identified. Metadata and other information (e.g., a route of the motor vehicle) may be stored in a database at mission control. Additionally, or alternatively, advertisements of media content and their respective rules for displaying to other road users may also be stored in the database at mission control.

In some embodiments, and by way of a non-limiting example, an autonomous vehicle may include a database configured to store advertisements or media content and their respective rules for displaying to other road used pushed to the autonomous vehicle by mission control, and metadata information collected or derived using the sensors of the autonomous vehicle.

By way of a non-limiting example, based on the identified route of a motor vehicle using the metadata, the autonomous vehicle may be configured to display advertisements or media content of businesses on the identified route of the motor vehicle, when the motor vehicle is seen by the autonomous vehicle on the road. Additionally, or alternatively, employment opportunities along the route may also be displayed.

In some embodiments, sound data collected using the one or more microphones or visual data collected using the one or more cameras may be analyzed to identify a mechanical problem or other issues (such as cracked windshield, rust, etc.), and display messages, advertisements or media content related to the identified mechanical problem or other issues, or businesses where the identified mechanical problem or other issues may be repaired or fixed.

Additionally, or alternatively, using the one or more LiDAR sensors, or one or more RADAR sensors, the autonomous vehicle may determine speed of other vehicles on the road. If a particular vehicle, identified based on the metadata, is found to be driving at a speed higher than the posted speed limit, or driving in a pattern (e.g., frequent changing lanes, sudden acceleration or deceleration) that is generally more accident prone, then a message, an advertisement, or media content related to safe driving may be displayed by the autonomous vehicle.

In some embodiments, depending on the identified make and model of the vehicle, the autonomous vehicle may display advertisements or media content of new vehicle models or offers for trade-in or sell of the vehicles to dealers in an area of the current location of the autonomous vehicle.

In some embodiments, the autonomous vehicle may have a visual display device on the rear of the autonomous vehicle, and/or a visual display device on each side of the autonomous vehicle. The autonomous vehicle may display the same or different advertisements or media content on each visual display device on the rear or side of the autonomous vehicle.

Accordingly, various embodiments described herein provide an autonomous vehicle able to extract real-time metadata regarding geo-location, traffic density, and other moving vehicle's make, model, and license plate information, for a targeted advertising system displaying advertisements or media content via a trailer mounted dynamic advertising display. For example, when the autonomous vehicle is stuck in heavy traffic, advertisements for vacation escapes to places with no traffic issues may be displayed. Various embodiments are discussed in more detail below with respect to FIGS. 1-9.

FIG. 1 illustrates an autonomous vehicle 100 that may further be conventionally connected to a single or tandem trailer to transport the trailers (not shown) to a desired location. The vehicle 100 includes a cabin 114 and can be supported by, and steered in, the required direction by front wheels 112a, and rear wheels 112c that are partially shown in FIG. 1. Wheels 112a, 112b are positioned by a steering system that includes a steering wheel and a steering column (not shown in FIG. 1). A trailer 116 may be attached to the cabin 114, and may have a plurality of display devices 118a-118c mounted on a plurality of exterior sides of the autonomous vehicle 100. Even though, only three display devices 118a-118c are shown in FIG. 1, there may be any number of display devices mounted on the plurality of exterior sides of the autonomous vehicle 100.

A master control unit (MCU) (not shown in FIG. 1) of the autonomous vehicle 100 may periodically transmit telematics data via one or more antennas (not shown in FIG. 1) to mission control. As described herein, the telematics data may include, but is not limited to, global positioning system (GPS) data of the autonomous vehicle 100, speed of the autonomous vehicle 100, vehicle maintenance data corresponding to the autonomous vehicle 100, or sensor data (or metadata) related to other objects (such as road users or other motor vehicles) for example. Additionally, or alternatively, mission control may request the autonomous vehicle 100 send the telematics data, or metadata of other motor vehicles, and the autonomous vehicle 100 may send the telematics data or metadata to mission control for displaying targeted advertisements or media content to the road users or other motor vehicle users. The MCU may also receive data from a sensor network including one or more sensors such as cameras, acoustic sensors, RADAR sensors, or LiDAR sensors, etc. The data received from the sensor network may be used for generating, identifying, or extracting metadata of other motor vehicles in the environment of the autonomous vehicle 100 by the MCU.

Figure 2:
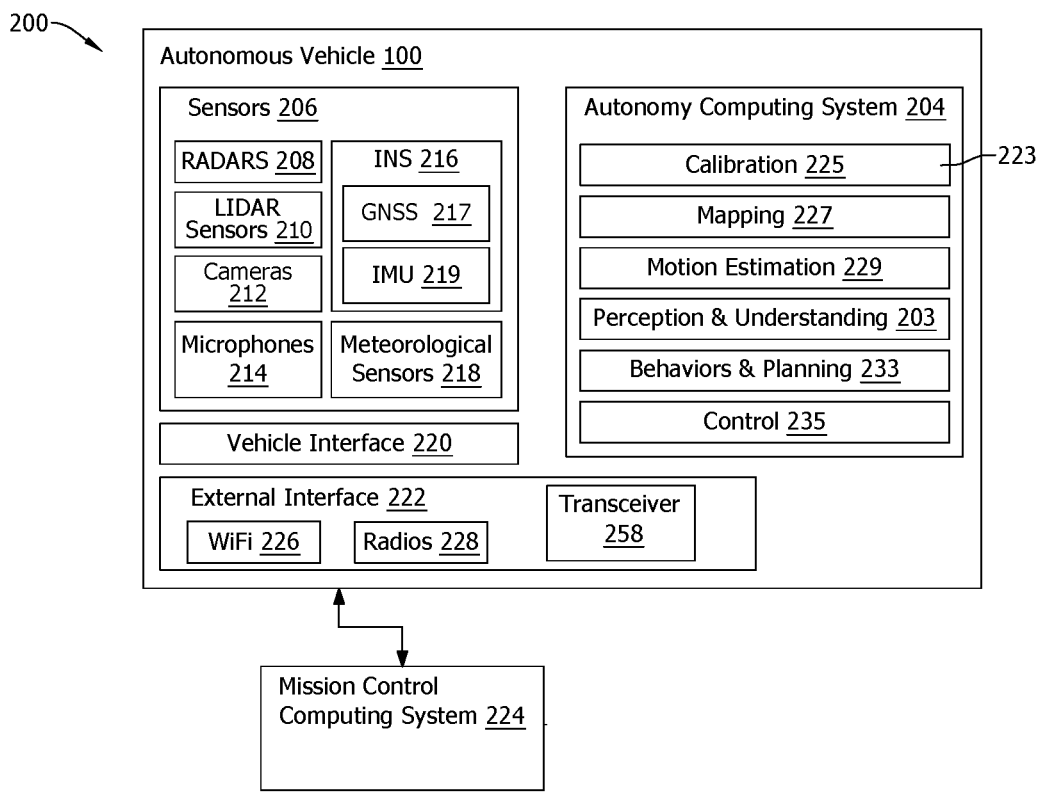
FIG. 2 is a block diagram of an example autonomous driving system.

FIG. 2 is a block diagram of an autonomous driving system 200, including an autonomous vehicle 100 (shown in FIG. 1) that is communicatively coupled with a mission control computing system 224.

In some embodiments, the mission control computing system 224 may transmit control commands or data to the autonomous vehicle 100, such as navigation commands, and travel trajectories to the autonomous vehicle 100, and may receive telematics data from the autonomous vehicle 100.

In some embodiments, the autonomous vehicle 100 may further include sensors 206. Sensors 206 may include RADAR devices 208, LiDAR sensors 210, cameras 212, and acoustic sensors 214. The sensors 206 may further include an inertial navigation system (INS) 216 configured to determine states such as the location, orientation, and velocity of the autonomous vehicle 100. The INS 216 may include at least one global navigation satellite system (GNSS) receiver 217 configured to provide positioning, navigation, and timing using satellites. The INS 216 may also include an IMU 219 configured to measure motion properties such as the angular velocity, linear acceleration, or orientation of the autonomous vehicle 100. The sensors 206 may further include meteorological sensors 218.

Meteorological sensors 218 may include a temperature sensor, a humidity sensor, an anemometer, pitot tubes, a barometer, a precipitation sensor, or a combination thereof. The meteorological sensors 218 are used to acquire meteorological data, such as the humidity, atmospheric pressure, wind, or precipitation, of the ambient environment of autonomous vehicle 100.

The autonomous vehicle 100 may further include a vehicle interface 220, which interfaces with an engine control unit (ECU) (not shown) or a MCU (not shown) of autonomous vehicle 100 to control the operation of the autonomous vehicle 100 such as acceleration and steering, in addition to control display of the targeted advertisements or media content on one or more display devices mounted on the rear or the side of the autonomous vehicle 100. The vehicle interface 220 may be a controller area network (CAN) bus interface.

The autonomous vehicle 100 may further include external interface 222 configured to communicate with external devices or systems such as another vehicle or mission control computing system 224. The External interface 222 may include Wi-Fi 226, other radios 228 such as Bluetooth, or a suitable wired or wireless transceiver 238 such as a cellular communication device. Data detected by the sensors 206 may be transmitted to the mission control computing system 224 via the external interface 222, or to the ECU or MCU via the vehicle interface 220.

The autonomous vehicle 100 may further include an autonomy computing system 204. The autonomy computing system 204 may control driving of the autonomous vehicle 100 through the vehicle interface 220. The autonomy computing system 204 may operate the autonomous vehicle 100 to drive the autonomous vehicle from one location to another. Additionally, or alternatively, the autonomy computing system 204 may control display of the targeted advertisements or media content on the one or more display devices mounted on the rear or the side of the autonomous vehicle 100.

In some embodiments, the autonomy computing system 204 may include modules 223 for performing various functions. Modules 223 may include a calibration module 225, a mapping module 227, a motion estimation module 229, perception and understanding module 203, behaviors and planning module 233, and a control module 235. Perception and understanding module 203 may be configured to analyze data from sensors 206 to identify an object. Modules 223 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the autonomous vehicle 100.

Various embodiments described herein for perceiving or identifying objects in the environment of the autonomous vehicle 100 may be implemented using the perception and understanding module 203. In some embodiments, based on the data collected from the sensors 206, the autonomy computing system 204 and, more specifically, perception and understanding module 203 senses the environment surrounding autonomous vehicle 100 by gathering and interpreting sensor data. Perception and understanding module 203 interprets the sensed environment by identifying each object in the environment based on the metadata (e.g., make, model, or license plate information of other motor vehicles). For example, perception and understanding module 203 in combination with various sensors 206 (e.g., LiDAR, camera, radar, etc.) of the autonomous vehicle 100 may identify a make or a model of the motor vehicle, and license plate information of the motor vehicle proximate to the autonomous vehicle 100.

In some embodiments, a method of controlling targeted advertisements or media content on a display of an autonomous vehicle, such as autonomous vehicle 100, includes collecting perception data representing a perceived environment of autonomous vehicle 100 using perception and understanding module 203, and based on the different objects or motor vehicles identified from the collected perception data, identifying route pattern for each motor vehicle, identifying driving pattern for each motor vehicle, or identifying advertisements or media content for displaying on one or more display devices 118a-118c, which are mounted on one or more exterior sides of the autonomous vehicle 100, to each identified motor vehicle. Perception data may include sensor data from sensors 206, such as cameras 212, LiDAR sensors 210, GNSS receiver 217, acoustic sensors 214, or IMU 219.

Mapping module 227 receives perception data that can be compared to one or more digital maps stored in mapping module 227 to determine where autonomous vehicle 100 is in the world or where autonomous vehicle 100 is on the digital map(s). In particular, mapping module 227 may receive perception data from perception and understanding module 203 or from the various sensors sensing the environment surrounding autonomous vehicle 100 and may correlate features of the sensed environment with details (e.g., digital representations of the features of the sensed environment) on the one or more digital maps. The digital map may have various levels of detail and can be, for example, a raster map, or a vector map. The digital maps may be stored locally on autonomous vehicle 100 or stored and accessed remotely. In at least one embodiment, autonomous vehicle 100 deploys with sufficient stored information in one or more digital map files to complete a mission without connection to an external network during the mission.

In the example embodiment, behaviors and planning module 233 and control module 235 plan and implement one or more behavior-based trajectories to operate the autonomous vehicle 100 similar to a human driver-based operation. The behaviors and planning module 233 and control module 235 use inputs from the perception and understanding module 203 or mapping module 227 to generate trajectories or other planned behaviors. For example, behavior and planning module 233 may generate potential trajectories or actions and select one or more of the trajectories to follow or enact as the vehicle travels along the road. The trajectories may be generated based on proper (i.e., legal, customary, or safe) interaction with other static and dynamic objects in the environment. Behaviors and planning module 233 may generate local objectives (e.g., following rules or restrictions) such as, for example, lane changes, stopping at stop signs, etc. Additionally, behavior and planning module 233 may be communicatively coupled to, include, or otherwise interact with motion planners, which may generate paths or actions to achieve local objectives. Local objectives may include, for example, reaching a goal location while avoiding obstacle collisions.

In the example embodiment, based on the data collected from sensors 206, autonomy computing system 204 is configured to perform calibration, analysis, and planning, and control the operation and performance of autonomous vehicle 100. For example, autonomy computing system 204 is configured to estimate the motion of autonomous vehicle 100, calibrate the sensors of autonomous vehicle 100, and provide a map of surroundings of autonomous vehicle 100 or the travel routes of autonomous vehicle 100. Autonomy computing system 204 is configured to analyze the behaviors of autonomous vehicle 100 and generate and adjust the trajectory plans for the autonomous vehicle 100 based on the behaviors computed by behaviors and planning module 233.

Figure 3:
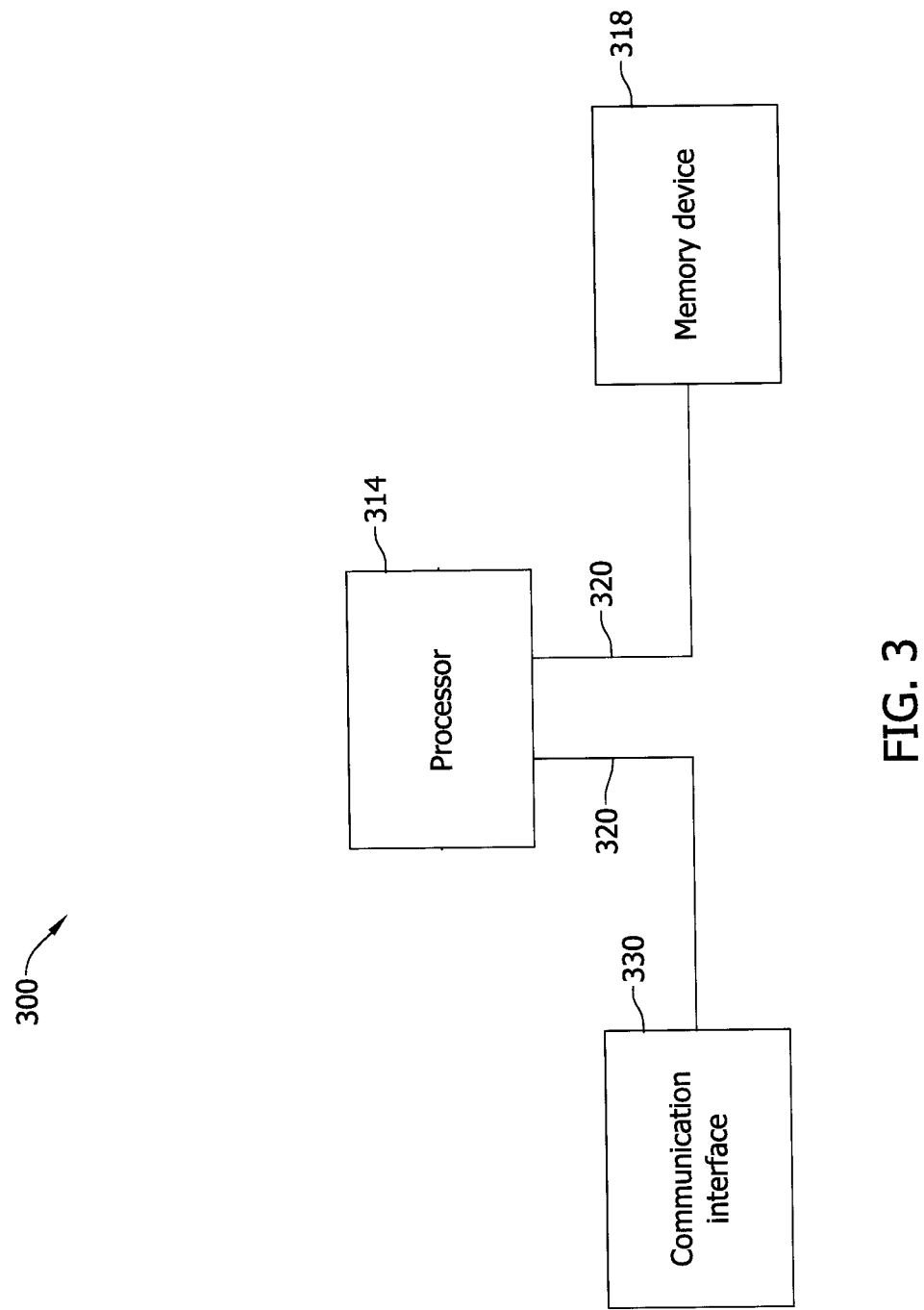
FIG. 3 is a block diagram of an example computing device.

Method operations described herein may be implemented on autonomy computing system 204, or more specifically on perception and understanding module 203. Additionally, or alternatively, the method operations may be performed on an ECU or MCU. Autonomy computing system 204 (or perception and understanding module 203) described herein may be any suitable computing device and software implemented therein. FIG. 3 is a block diagram of an example computing device 300.

Computing device 300 includes a processor 314 and a memory device 318. The processor 314 is coupled to the memory device 318 via a system bus 320. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor."

In the example embodiment, the memory device 318 includes one or more devices that enable information, such as executable instructions or other data, to be stored and retrieved. Moreover, the memory device 318 includes one or more computer readable media, such as, without limitation, dynamic random access memory (DRAM), static random access memory (SRAM), a solid state disk, or a hard disk. In the example embodiment, the memory device 318 stores, without limitation, application source code, application object code, configuration data, additional input events, application states, assertion statements, validation results, a hierarchical representation tree including various nodes and sub-nodes, or any other type of data. The computing device 300, in the example embodiment, may also include a communication interface 330 that is coupled to the processor 314 via system bus 320. Moreover, the communication interface 330 is communicatively coupled to data acquisition devices.

In the example embodiment, processor 314 may be programmed by encoding an operation using one or more executable instructions and providing the executable instructions in the memory device 318. In the example embodiment, the processor 314 is programmed to select a plurality of measurements that are received from data acquisition devices.

In operation, a computer executes computer-executable instructions embodied in one or more computer-executable components stored on one or more computer-readable media to implement aspects of the invention described or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Figure 4:
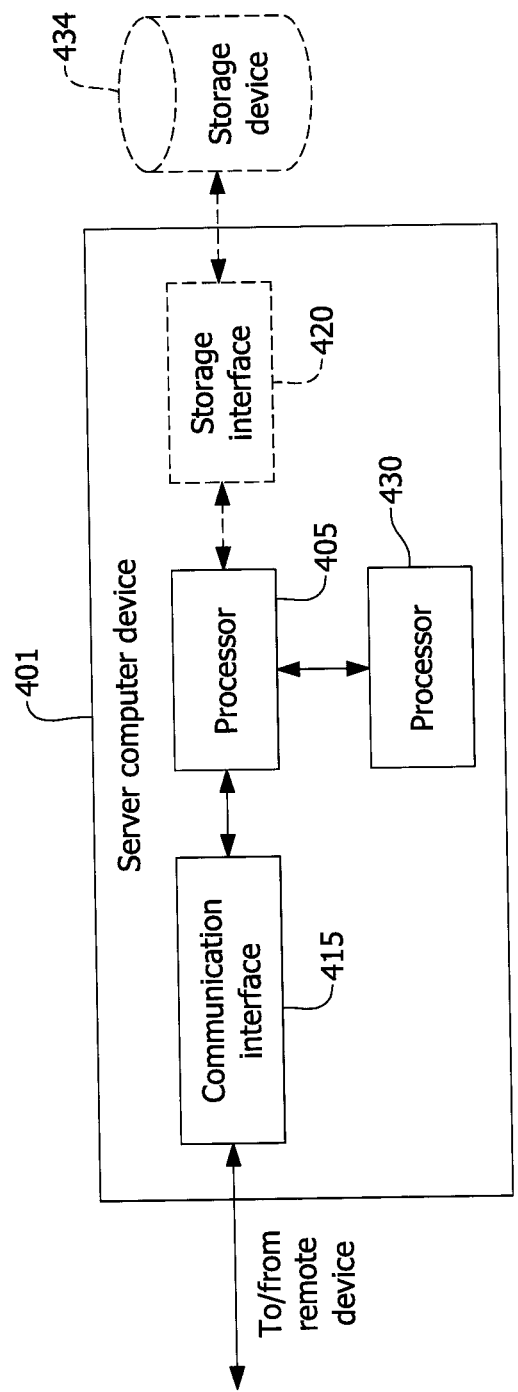
FIG. 4 is a block diagram of an example server computing device.

FIG. 4 illustrates an example configuration of a server computer device 401 such as mission control computing system 224. The server computer device 401 also includes a processor 405 for executing instructions. Instructions may be stored in a memory area 430, for example. Processor 405 may include one or more processing units (e.g., in a multi-core configuration). By way of a non-limiting example, in some embodiments, the server computing device 401 may receive sensor data for object classification from the autonomous vehicle 100, and the processor 405 may generate a hierarchical representation tree including various nodes and sub-nodes based on the sensor data according to the embodiments described herein.

Processor 405 is operatively coupled to a communication interface 415 such that server computer device 401 is capable of communicating with a remote device or another server computer device 401. For example, communication interface 415 may receive data from autonomy computing system 204 or sensors 206, via the Internet or wireless communication.

Processor 405 may also be operatively coupled to a storage device 434. Storage device 434 is any computer-operated hardware suitable for storing and/or retrieving data.

In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include multiple storage units such as hard disks and/or solid state disks in a redundant array of independent disks (RAID) configuration. storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
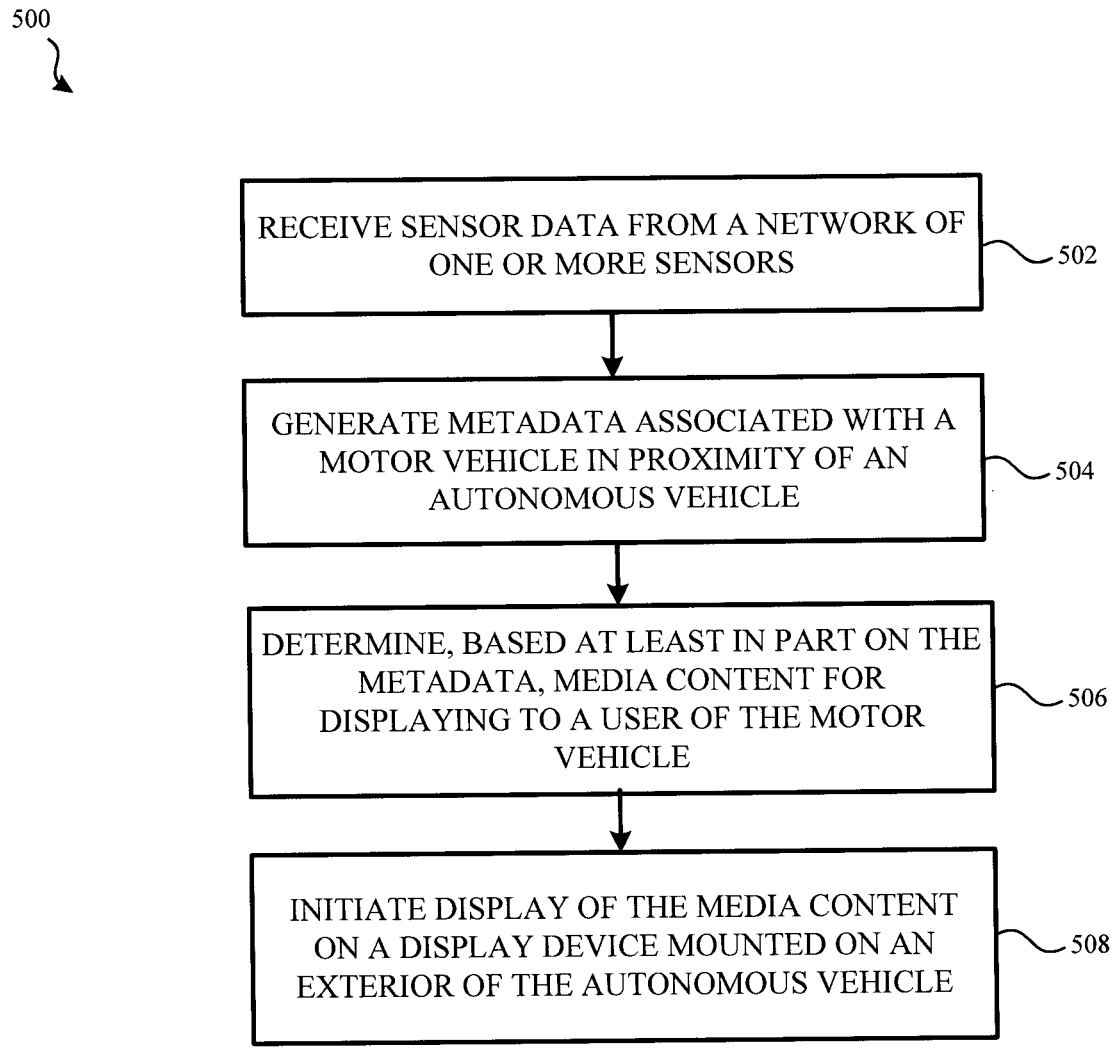
FIG. 5 is a flow-chart of an example method being performed by the example autonomous driving system shown in FIG. 2.

FIG. 5 is a flow-chart 500 of an example method being performed by the example autonomous driving system shown in FIG. 2. As shown in FIG. 5, a computing device of an autonomous vehicle, such as the ECU or MCU, or the autonomy computing system 204 may receive 502 sensor data from a network of one or more sensors, such as the sensors 206, shown in FIG. 2, including at least one or more acoustic sensors, one or more cameras, one or more radar sensors, or one or more lidar sensors. From the sensor data, metadata associated with a motor vehicle in proximity of the autonomous vehicle may be generated 504. As described herein, the metadata includes a make, a model, or license plate information of the motor vehicle in proximity of the autonomous vehicle and based on visual images or videos from cameras 212, the metadata associated each motor vehicle in proximity of the autonomous vehicle may be generated. The generated metadata may be stored in a database or a datastore locally at the autonomous vehicle.

Based at least in part on the generated metadata, media content for displaying to a user of the motor vehicle may be determined 506. In some embodiments, and by way of a non-limiting example, the media content may be identified based on the make or the model of the motor vehicle, such as a new model of the motor vehicle of the same make or any trade-in offer available from dealership in the area of the current location of the autonomous vehicle. In some embodiments, the sensor data may also include acoustic sensor data from the microphones 414, and based on the acoustic sensor data, a particular mechanical issue with the motor vehicle may be identified. The acoustic sensor data may be processed or filtered using Kalman Adaptive Filter and algorithms trained to identify mechanical issues with a rotating equipment of the motor vehicle. Accordingly, the media content related to fixing or repairing the mechanical issue may be determined for displaying to the user of the motor vehicle.

In some embodiments, the sensor data may also include visual sensor data from the cameras 412, and based on the visual sensor data, a damage to the motor vehicle may be identified. The damage that may be identified using the visual sensor data may include damage to a windshield, a headlight, a taillight, a turn-signal light, rust on the body of the motor vehicle, a broken mirror, etc. Accordingly, the media content related to fixing or repairing the damage may be identified for displaying to the user of the motor vehicle. In some examples, based on the sensor data, for example, from the radars 408 or lidar sensors 410, a driving pattern including, but not limited to, speed of the motor vehicle, lane changes, etc., may be determined. Based on the driving pattern, if it is determined that the user of the motor vehicle is frequently going above the posted speed limit, media content related to products associated with the driving pattern of the user may be identified for displaying to the user. By way of a non-limiting example, products associated with the driving pattern may include advertisements showing harms of speeding, driving under influence, advertisements related to auto insurance or auto accident claims, etc.

The media content may be initiated 508 for display one or more display devices mounted on an exterior of the autonomous vehicle. In some embodiments, different media content may be displayed on each display device of the one or more display devices mounted on the exterior of the autonomous vehicle. Additionally, or alternatively, based on the targeted user of the motor vehicle and its position relative to the autonomous vehicle, the media content may be displayed on a particular display device of the one or more display devices mounted on the exterior of the autonomous vehicle. The media content may be displayed for a predetermined time duration.

Figure 6:
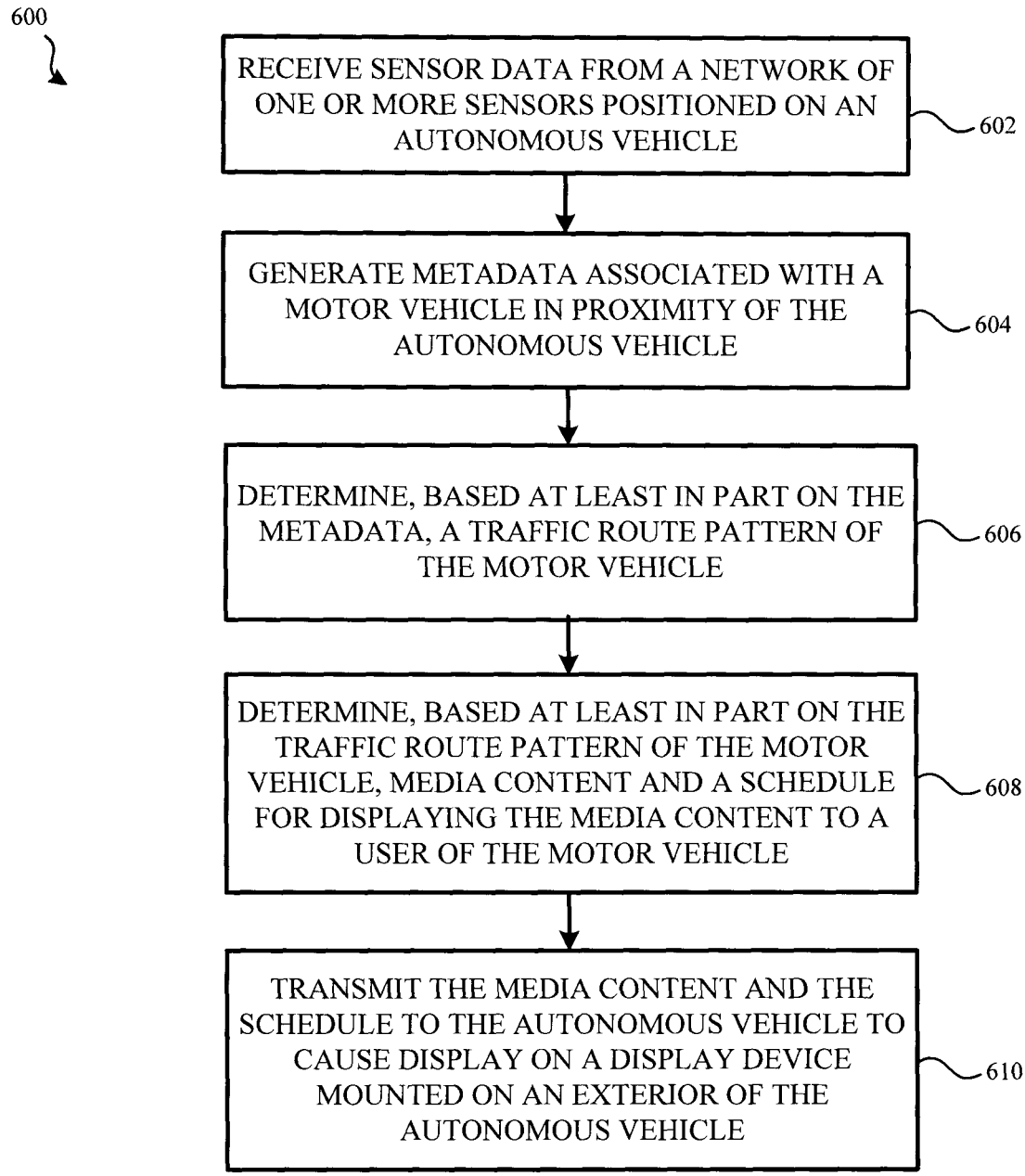
FIG. 6 is a flow-chart of an example method being performed by the example server computing device shown in FIG. 4.

FIG. 6 is a flow-chart of 600 an example method being performed by the example server computing device shown in FIG. 4. The server computing device 400 may receive 602 sensor data from a computing device of an autonomous vehicle. The sensor data may be received by the computing device of the autonomous vehicle from a network of one or more sensors, such as the sensors 206, shown in FIG. 2, including at least one or more acoustic sensors, one or more cameras, one or more radar sensors, or one or more lidar sensors. From the sensor data, metadata associated with a motor vehicle in proximity of the autonomous vehicle may be generated 604. As described herein, the metadata includes a make, a model, or license plate information of the motor vehicle in proximity of the autonomous vehicle and based on visual images or videos from cameras 212, the metadata associated each motor vehicle in proximity of the autonomous vehicle may be generated. The generated metadata may be stored in a database or a datastore communicatively coupled with the server computing device 400.

The server computing device 400 may receive sensor data from a plurality of autonomous vehicles and based on the sensor data received from the plurality of autonomous vehicles and based on the license plate information of the motor vehicle, different locations at which the motor vehicle is spotted at different times over a predetermined number of days, a traffic route pattern of the motor vehicle may be determined 606. Based on the traffic route pattern, media content and a schedule for displaying the media content to a user of the motor vehicle may be determined 608. The media content and the schedule may be transmitted 610 to the computing device of the autonomous vehicle to cause display on one or more display devices mounted on an exterior of the autonomous vehicle.

In some embodiments, and by way of a non-limiting example, the media content may be identified based on the make or the model of the motor vehicle, such as a new model of the motor vehicle of the same make or any trade-in offer available from dealership in the area of the current location of the autonomous vehicle. In some embodiments, the sensor data may also include acoustic sensor data from the microphones 414, and based on the acoustic sensor data, a particular mechanical issue with the motor vehicle may be identified. The acoustic sensor data may be processed or filtered using Kalman Adaptive Filter and algorithms trained to identify mechanical issues with a rotating equipment of the motor vehicle. Accordingly, the media content related to fixing or repairing the mechanical issue may be determined for displaying to the user of the motor vehicle.

In some embodiments, the sensor data may also include visual sensor data from the cameras 412, and based on the visual sensor data, a damage to the motor vehicle may be identified. The damage that may be identified using the visual sensor data may include damage to a windshield, a headlight, a taillight, a turn-signal light, rust on the body of the motor vehicle, a broken mirror, etc. Accordingly, the media content related to fixing or repairing the damage may be identified for displaying to the user of the motor vehicle. In some examples, based on the sensor data, for example, from the radars 408 or lidar sensors 410, a driving pattern including, but not limited to, speed of the motor vehicle, lane changes, etc., may be determined. Based on the driving pattern, if it is determined that the user of the motor vehicle is frequently going above the posted speed limit, media content related to products associated with the driving pattern of the user may be identified for displaying to the user. By way of a non-limiting example, products associated with the driving pattern may include advertisements showing harms of speeding, driving under influence, advertisements related to auto insurance or auto accident claims, etc.

Accordingly, various embodiments described herein provide an autonomous vehicle the ability to extract real-time metadata regarding geo-location, traffic density, and other moving vehicle's make, model, and license plate information, for a targeted advertising system displaying advertisements or media content via a trailer mounted dynamic advertising display.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous driving system comprising:
   a server computing device comprising:
     at least one server computing device processor; and
     at least one server computing device memory storing instructions, which, when executed by the at least one server computing device processor, configure the at least one server computing device processor to:
       receive, from each of a plurality of autonomous vehicles, metadata associated with a motor vehicle in proximity to the plurality of autonomous vehicles, wherein the metadata includes at least one of i) license plate information of the motor vehicle or ii) a make and model of the motor vehicle;
       determine a traffic route pattern of the motor vehicle based at least in part on the metadata received from the plurality of autonomous vehicles;
       generate, based on the determined traffic route pattern of the motor vehicle, a schedule including one or more rules for causing display of media content on one or more display devices; and
       transmit the generated schedule including the one or more rules to at least one of the plurality of autonomous vehicles; and
   an autonomous vehicle comprising:
     a network of one or more sensors positioned on a body of the autonomous vehicle configured to generate sensor data used to control driving operation of the autonomous vehicle;
     one or more display devices mounted on one or more exterior sides of the autonomous vehicle;
     at least one vehicle processor in communication with the server computing device; and
     at least one vehicle memory storing instructions, which, when executed by the at least one vehicle processor, configure the at least one vehicle processor to:
       receive sensor data from the network of one or more sensors;
       generate, from the sensor data, metadata associated with the motor vehicle, wherein the motor vehicle is in proximity of the autonomous vehicle, and wherein the metadata includes at least one of i) the license plate information of the motor vehicle or ii) the make and model of the motor vehicle;
       transmit, to the server computing device, the generated metadata associated with the motor vehicle in proximity of the autonomous vehicle;
       receive, from the server computing device, the generated schedule including the one or more rules;
       determine media content for displaying to a user of the motor vehicle based on the one or more rules;
       initiate display of the media content on the one or more display devices mounted on the one or more exterior sides of the autonomous vehicle; and
       control driving operation of the autonomous vehicle while causing the one or more display devices mounted on the one or more exterior sides of the autonomous vehicle to display the media content.

2. The autonomous driving system of claim 1, wherein the network of one or more sensors includes at least one or more acoustic sensors, one or more cameras, one or more radar sensors, or one or more lidar sensors.

3. The autonomous driving system of claim 1, wherein the sensor data includes visual data, and wherein the at least one vehicle processor is further configured to:
   identify, based at least in part on the sensor data and including the visual data, a damage to the motor vehicle in proximity of the autonomous vehicle; and
   wherein determining the media content based on the one or more rules comprises determining media content related to fixing or repairing the damage to the motor vehicle.

4. The autonomous driving system of claim 1, wherein the at least one vehicle processor is further configured to:
   identify, based at least in part on the sensor data, a driving pattern of the motor vehicle in proximity of the autonomous vehicle; and
   wherein determining the media content based on the one or more rules comprises determining media content related to products associated with the driving pattern of the motor vehicle, wherein the media content comprises an auto insurance or accident claim related advertisement.

5. A computer-implemented method, comprising:
   generating, by a network of one or more sensors positioned on a body of an autonomous vehicle, sensor data used to control driving operation of the autonomous vehicle;
   receiving, at one or more vehicle processors of the autonomous vehicle, the sensor data from the network of one or more sensors;
   generating, by the one or more vehicle processors and from the sensor data, metadata associated with a motor vehicle in proximity of the autonomous vehicle, wherein the metadata includes at least one of i) license plate information of the motor vehicle or ii) a make and model of the motor vehicle;
   transmitting, by the one or more vehicle processors, to a server computing device separate from the autonomous vehicle, the generated metadata associated with the motor vehicle in proximity of the autonomous vehicle;
   receiving, by at least one server computing device processor of the server computing device, the generated metadata associated with the motor vehicle in proximity of the autonomous vehicle;
   receiving, by the least one server computing device processor and from one or more other autonomous vehicles, additional metadata associated with the motor vehicle in proximity to the one or more other autonomous vehicles, wherein the additional metadata includes at least one of i) the license plate information of the motor vehicle or ii) the make and model of the motor vehicle;

determining, by the least one server computing device processor, a traffic route pattern of the motor vehicle based at least in part on the generated metadata and the additional metadata;

generating, by at least one server computing device processor of the server computing device and based on the determined traffic route pattern of the motor vehicle, a schedule including one or more rules for causing display of media content on one or more display devices;

transmitting, by the least one server computing device processor, the generated schedule including the one or more rules to the autonomous vehicle;

receiving, at the one or more vehicle processors of the autonomous vehicle, the transmitted schedule including the one or more rules;

determining, by the one or more vehicle processors, media content for displaying to a user of the motor vehicle based on the one or more rules;

initiating, by the one or more vehicle processors, display of the media content on one or more display devices mounted on one or more exterior sides of the autonomous vehicle; and controlling, by the one or more vehicle processors, operation of the autonomous vehicle while causing the one or more display devices mounted on the one or more exterior sides of the autonomous vehicle to display the media content.

6. The computer-implemented method of claim 5, wherein the network of one or more sensors includes at least one or more acoustic sensors, one or more cameras, one or more radar sensors, or one or more lidar sensors.

7. The computer-implemented method of claim 5, wherein the determining the media content comprises identifying media content related to the make or the model of the motor vehicle in proximity of the autonomous vehicle.

8. The computer-implemented method of claim 5, wherein the sensor data includes acoustic sensor data, the method further comprising:

identifying, based at least in part on the sensor data and including the acoustic sensor data, a mechanical issue with the motor vehicle in proximity of the autonomous vehicle; and wherein determining the media content based on the one or more rules comprises determining media content related to fixing or repairing the mechanical issue.

9. The computer-implemented method of claim 5, wherein the sensor data includes visual data, the method further comprising:

identifying, based at least in part on the sensor data and including the visual data, a damage to the motor vehicle in proximity of the autonomous vehicle; and wherein determining the media content based on the one or more rules comprises determining media content related to fixing or repairing the damage to the motor vehicle.

10. The computer-implemented method of claim 5, further comprising:

identifying, based at least in part on the sensor data, a driving pattern of the motor vehicle in proximity of the autonomous vehicle; and wherein determining the media content based on the one or more rules comprises determining media content related to products associated with the driving pattern of the motor vehicle.

\* \* \* \* \*